(12) United States Patent
Laborenz et al.

(10) Patent No.: US 11,692,528 B2
(45) Date of Patent: Jul. 4, 2023

(54) METHOD OF OPERATING A WIND TURBINE

(71) Applicant: Nordex Energy SE & Co. KG, Hamburg (DE)

(72) Inventors: Jacob Laborenz, Hannover (DE); Joerg Schwarte, Rostock (DE); Christian Maass, Hamburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 65 days.

(21) Appl. No.: 17/472,364

(22) Filed: Sep. 10, 2021

(65) Prior Publication Data

US 2022/0082086 A1 Mar. 17, 2022

(30) Foreign Application Priority Data

Sep. 14, 2020 (EP) .................................... 20196032

(51) Int. Cl.
*F03D 7/04* (2006.01)

(52) U.S. Cl.
CPC .......... *F03D 7/045* (2013.01); *F05B 2260/84* (2013.01); *F05B 2270/1095* (2013.01); *F05B 2270/331* (2013.01); *F05B 2270/332* (2013.01); *F05B 2270/404* (2013.01)

(58) Field of Classification Search
CPC .................. F03D 7/045; F05B 2260/84; F05B 2270/1095; F05B 2270/331; F05B 2270/332; F05B 2270/404
See application file for complete search history.

(56) References Cited

U.S. PATENT DOCUMENTS

| 9,605,654 B2 | 3/2017 | Wickstroem | |
|---|---|---|---|
| 11,041,483 B2 | 6/2021 | Tomas et al. | |
| 2007/0198215 A1* | 8/2007 | Bonanni | G05B 23/0251 702/182 |
| 2011/0206512 A1 | 8/2011 | Hedges et al. | |
| 2013/0302161 A1* | 11/2013 | Koerber | F03D 7/0224 416/9 |

(Continued)

FOREIGN PATENT DOCUMENTS

| CN | 108092319 A | * | 5/2018 |
|---|---|---|---|
| CN | 107681691 B | * | 1/2020 |

(Continued)

*Primary Examiner* — Ronald D Hartman, Jr.
(74) *Attorney, Agent, or Firm* — Walter Ottesen, P.A.

(57) ABSTRACT

The disclosure relates to a method for operating a wind turbine wherein the method includes: operating the wind turbine over an operating period in accordance with a control strategy, providing one or more input values representing a load acting on at least one component of the wind turbine and providing uncertainties of the input values, determining, based on the input values, an aggregated load value representing an aggregated load acting on the at least one component of the wind turbine over an aggregation period, determining, based on the uncertainties of the input values, an uncertainty of the aggregated load value, determining a statistical load aggregate from the aggregated load value and the uncertainty of the aggregated load value, adjusting the control strategy based on the statistical load aggregate. The disclosure further relates to a wind turbine and a wind farm configured to perform the above method.

17 Claims, 3 Drawing Sheets

(56) References Cited

U.S. PATENT DOCUMENTS

| | | | | |
|---|---|---|---|---|
| 2014/0288855 A1* | 9/2014 | Deshpande | ........... | F03D 7/0292 |
| | | | | 702/34 |
| 2019/0178231 A1* | 6/2019 | Tomas | ................ | F03D 7/0292 |
| 2021/0123416 A1 | 4/2021 | Vestergaard et al. | | |

FOREIGN PATENT DOCUMENTS

| | | | | |
|---|---|---|---|---|
| CN | 113313139 A | * | 8/2021 | |
| EP | 2 302 208 A1 | | 3/2011 | |
| EP | 2302208 A1 | * | 3/2011 | ........... F03D 7/0224 |
| EP | 3 499 022 A1 | | 6/2019 | |
| KR | 101706508 B1 | * | 2/2017 | |
| WO | 2019/214785 A1 | | 11/2019 | |

* cited by examiner

METHOD OF OPERATING A WIND TURBINE

CROSS REFERENCE TO RELATED APPLICATION

This application claims priority of European patent application no. 20 196 032.5, filed Sep. 14, 2020, the entire content of which is incorporated herein by reference.

TECHNICAL FIELD

The disclosure pertains to a method of operating a wind turbine and to a wind turbine, or a wind farm including such a wind turbine, the wind turbine or the wind farm being able to execute the method. In general, the disclosure is concerned with operating a wind turbine based on loads acting on one or more components of the wind turbine.

BACKGROUND

It is conventional, when siting a wind turbine or a wind farm, to first measure the weather conditions at the proposed site for a specific reference period, for example, for one year. These measurements are then correlated to a reference dataset, in particular a weather dataset for a specific year, and are extrapolated to a predetermined lifetime of the wind turbine, for example, 20 to 30 years. Based on this, a control strategy for operating the turbine over its lifetime is devised, in particular depending on a predicted fatigue loading that the turbine will experience during its lifetime or service life, the fatigue loading being predicted on the basis of the measurements. The device control strategy may include static control features such as wind sector operational modes, which may for example set turbine information in a given sector or shut down a turbine in a given sector of a wind farm. The device control strategy may be configured to balance the turbine lifetime, operational expenditure and annual energy production. The turbine is then constructed and operated based on the control strategy for its predetermined lifetime, which may be between 20 to 30 years.

Such a predetermined control strategy, however, does not allow the actual site conditions during operation of the turbine to be accounted for in the control strategy of the turbine. Thus, with such a fixed control strategy, changes in environmental conditions, such as wind intensity and/or direction, may not be accounted for. It has therefore been proposed to modify the control strategy based on operational data acquired during operation of the wind turbine.

US 2014/0123416 A1 describes a method of operating a wind turbine, wherein a sensor signal from a sensor measuring an operational parameter of the wind turbine is used as an input for a model to obtain a modelled fatigue value, the modelled fatigue value providing an estimate of fatigue loading applied to a component of the wind turbine over the operating period. Based on the modelled fatigue value, the control strategy is modified.

U.S. Pat. No. 9,605,654 B2 describes a method of operating a wind turbine, wherein a residual lifetime is determined based on the ratio of an accumulated stress to a predicted stress of at least one component of the wind turbine, and wherein an operational setting of the turbine is adjusted based on the residual lifetime.

While these methods may help to balance turbine lifetime, operational expenditure and annual energy production, they are not very precise.

SUMMARY

Starting from the above, it is an object of the invention to provide a more precise adjustment of the control strategy with which a wind turbine is operated.

A method of operating a wind turbine according to the disclosure includes the following steps:
a. operating the wind turbine over an operating period in accordance with a control strategy;
b. providing one or more input values representing a load acting on at least one component of the wind turbine and providing uncertainties of the input values;
c. determining, based on the input values, an aggregated load value representing an aggregated load acting on the at least one component of the wind turbine over an aggregation period;
d. determining, based on the uncertainties of the input values, an uncertainty of the aggregated load value;
e. determining a statistical load aggregate from the aggregated load value and the uncertainty of the aggregated load value; and,
f. adjusting the control strategy based on the statistical load aggregate.

A wind turbine according to the disclosure includes a wind turbine controller which is adapted for executing the following steps:
a. operating the wind turbine over an operating period in accordance with a control strategy;
b. providing one or more input values representing a load acting on at least one component of the wind turbine and providing uncertainties of the input values;
c. determining, based on the input values, an aggregated load value representing an aggregated load acting on the at least one component of the wind turbine over an aggregation period;
d. determining, based on the uncertainties of the input values, an uncertainty of the aggregated load value;
e. determining a statistical load aggregate from the aggregated load value and the uncertainty of the aggregated load value; and,
f. adjusting the control strategy based on the statistical load aggregate.

A wind farm according to the disclosure includes a wind farm controller and at least one wind turbine, wherein the wind farm controller is adapted for executing the following steps:
a. operating the wind turbine over an operating period in accordance with a control strategy;
b. providing one or more input values representing a load acting on at least one component of the wind turbine and providing uncertainties of the input values;
c. determining, based on the input values, an aggregated load value representing an aggregated load acting on the at least one component of the wind turbine over an aggregation period;
d. determining, based on the uncertainties of the input values, an uncertainty of the aggregated load value;
e. determining a statistical load aggregate from the aggregated load value and the uncertainty of the aggregated load value; and,
f. adjusting the control strategy based on the statistical load aggregate.

Aspects of the invention and embodiments thereof, which are described in the following, pertain to the method as well as to the wind turbine and the wind farm. What will be stated with respect to the method is mutatis mutandis also valid for the wind turbine and the wind farm, the wind turbine controller and/or the wind farm controller being adapted to execute the respective method steps.

In general, according to the disclosure, a predetermined control strategy for operating the wind turbine or all of the wind turbines of the wind farm is adjusted based on determined loads acting on one or more of the components of the wind turbine. In contrast to the prior art, the control strategy is, however, adjusted not only based on these loads, but also on the uncertainties of these loads. Every input value that is a basis for the adjustment of the control strategy is afflicted by some kind of uncertainty, no matter whether the input value includes measured, estimated or simulated loads. For example, a measured input value can only be as exact as the sensor used for measuring is accurate. Thus, for example, the measurement accuracy of the measuring sensor may determine the uncertainty of the measured loads. This will be explained in more detail in the following.

According to the disclosure, one or more input values and their respective uncertainties are provided in step b, wherein these input values represent a load acting on at least one component of the wind turbine. These input values may be load values. In particular, measured loads, estimated loads or simulated loads may be provided as input values. For each of these values an uncertainty is provided as well.

Based on the input values, an aggregated load value is determined and, based on the uncertainties of the input values, an uncertainty of the aggregated load value is determined in steps c and d, respectively. The aggregated load value represents an aggregated load acting on the at least one component of the wind turbine over an aggregation period. While the input values may include load values representing loads acting at specific times during the operating period of the wind turbine, the aggregated load value represents an aggregated load acting on the respective component of the wind turbine over the aggregation period. The aggregated load may, for example, be the sum of the input values, in particular an integral over the input values over the aggregation period. The aggregation period may extend for example over one or more years, in particular over three years. However, the aggregation period may also be a fraction of a year. Thus, the aggregated load value may represent the load acting on the respective component of the wind turbine over a period of three years, for example, the past three years. According to the disclosure, not only the aggregated load value but also an uncertainty of the aggregated load value is determined. The uncertainty of the aggregated load value is based on the uncertainties of the input values. A model or algorithm may be provided to derive from the uncertainties of the input values the uncertainty of the aggregated load value.

From the aggregated load value and its uncertainty, a statistical load aggregate is determined in step e, in particular, the statistical load aggregate may be understood as including the aggregated load value and its uncertainty. Based on this statistical load aggregate, the control strategy may be adjusted according to step f. Thus, the control strategy is adjusted not only based on the aggregated load value, but also based on the uncertainty of the aggregated load value and therefore the uncertainties of the input values. Due to the uncertainties being taken into account, the method allows for a more precise adjustment of the control strategy. In particular, a failure probability or a remaining lifetime of the respective component of the wind turbine and of the wind turbine itself may be determined more accurately, as will be explained in the following.

As mentioned above, for example, measured loads, estimated loads or simulated loads may be provided as input values.

Thus, according to an embodiment, measured loads are provided as input values in step b. As a consequence, uncertainties of these measured loads are provided as well. In steps c to e, the aggregated load is then determined based on the measured loads, and the uncertainty of the aggregated load value is determined based on the uncertainties of the measured loads, so that the statistical load aggregate in this case is based on measured loads and their uncertainties. One or more sensors may be provided for measuring the loads acting on the at least one component of the wind turbine and providing the measured loads. The uncertainties of the measured loads may be derived from the measuring accuracy of the one or more sensors, as mentioned above. In case of measured loads, the uncertainty of the aggregated load value may be derived via error propagation.

For example, loads acting on a component of the wind turbine may be measured continuously via load sensors during operation of the wind turbine. At any time during the operation period, these measured load values may be aggregated to an aggregated load value over an aggregation period of, for example, three years. Aggregating the loads may include the measured loads being summed up. An uncertainty of this aggregated load value is determined as well, based on the uncertainties of the measured values. Thus, the summarized load the respective component has received over the last three years along with a measurement uncertainty is determined. Based on the aggregated load value and its uncertainty, that is, the statistical load aggregate, the future operation of the wind turbine, for example, for the remaining 17 years of operation, assuming a lifetime of 20 years, may be adjusted. With respect to this adjustment the statistical load aggregate may, for example, be compared to a lifetime resistance of the respective component, meaning an amount or pool of resistance that this component may include to counter loads acting on it. It may be derived from the statistical load aggregate that the loads acting on the component during the last three years were higher than a predicted load derived when configuring the wind turbine or wind farm. In this case, the control strategy may be adjusted such that the respective component receives less load for the remaining lifetime. If, for example, the component is a rotor blade, a pitch strategy for the rotor blade may be adjusted such that the rotor blade receives less load. On the other hand, if it is derived from the statistical load aggregate that the respective component has received a lesser amount of load during the three years, the control strategy may be adjusted such that more energy is taken from the wind at the cost of higher loads or in that the lifetime of the wind turbine is extended.

Instead of measured loads, estimated loads may be provided as input values. According to a respective embodiment in step b, estimated loads are provided as input values, wherein also uncertainties of the estimated loads are provided. The estimated loads are derived from estimation input data which is fed to an estimation model. The uncertainties of the estimated loads include an uncertainty of the estimation model as well as uncertainties of the estimation input data. In the following steps, the aggregated load value is determined based on the estimated loads in step c, and the uncertainty of the aggregated load value is determined based on the uncertainties of the estimated loads and the uncertainty of the estimation model in step d. In case of estimated loads, the uncertainty of the aggregated load value may be derived via error propagation. As mentioned, the estimated loads are determined from the estimation model, which may have, as an input, operational data of the wind turbine over a specific period as estimation input data. Thus, in contrast to directly measuring the loads, the loads may, according to this embodiment, be estimated based on prior data, for example, based on operational data from a prototype wind turbine or a wind turbine for testing that is not part of the wind farm. In this embodiment, the statistical load aggregate is therefore based on estimated loads and their uncertainties. Also, for these estimated loads, uncertainties are considered according to the disclosure. The uncertainties of the estimated loads include not only the uncertainties of the estimation input data, for example the mentioned operational data, but also the uncertainty of the estimation model which is used to estimate the loads. Thus, also when estimating loads, the method of the disclosure leads to more precise results, in particular a more precise adjustment of the control strategy.

According to a further embodiment, simulated loads are provided as input values. According to this embodiment in step b, simulated loads are provided as input values along with uncertainties of the simulated loads. The simulated loads are derived from simulation input data fed to a simulation model. The uncertainties of the simulated loads are derived from uncertainties of the simulation input data and an uncertainty of the simulation model. In step c, the aggregated load is determined based on the simulated loads and, in step d, the uncertainty of the aggregated load value is determined based on the uncertainty of the simulated loads and therefore on the uncertainties of the simulation input data as well as on the uncertainty of the simulation model. The uncertainty of the aggregated load value may be determined via probabilistic methods. According to this embodiment, the statistical load aggregate is therefore based on simulated values and their uncertainties. The simulation model may be based on aeroelastic multibody simulations, simplified analytic simulations or meta models. Based on simulated loads, a statistical load aggregate for the future may be determined. Thus, an adjustment of the control strategy may be done early on with respect to loads expected to act on the component of the wind turbine within the future, for example, within the next years. Again, considering the uncertainties of these simulated loads leads to a more precise adjustment of the control strategy.

According to an embodiment, adjusting the control strategy may include one or more of: adjusting the planned operation period of the at least one component of the wind turbine, adjusting the planned operation period of the wind turbine, adjusting one or more operation parameters of the wind turbine. Operation parameters of the wind turbine may, for example, be the blade pitch angle, a power output or the like. As mentioned above, depending on the loads the respective component has already received or will likely receive, the control strategy may be adjusted by changing the planned operation period of the wind turbine or by adjusting operational parameters.

According to an embodiment, at least two statistical load aggregates are determined in accordance with steps b to e, wherein a first statistical load aggregate is determined for a past aggregation period and a second statistical load aggregate is determined for a future aggregation period. In general, many more statistical load aggregates for further aggregation periods may be determined. Determining a statistical load aggregate not only for the past but also for the future allows for adjustment of the control strategy based on both these statistical load aggregates. The adjustment based on at least two statistical load aggregates is more precise.

According to an embodiment, a failure probability of the at least one component of the wind turbine is determined based on a reliability model for the at least one component having as input the statistical load aggregate of the at least one component and a resistance of the at least one component. In this case in particular, at least two statistical load aggregates may be provided, as explained above. Thus, the reliability model may have as an input a first statistical load aggregate pertaining to a past turbine operation and a second statistical load aggregate pertaining to a future turbine operation. The resistance of the at least one component means a resistance to the loads acting on the component. The resistance may in particular include a resistance value and an uncertainty of the resistance value. The reliability model may therefore have as an input the resistance value as well as the uncertainty of the resistance value. The resistance value of the at least one component is a measure for an amount of load the respective component may endure before breaking or losing its intended function. Based on the reliability model, the control strategy may then be adjusted according to step f. It can be particularly advantageous to also consider the uncertainty of the resistance value in this matter as this will further improve the precision of the adjustment.

In a respective embodiment, a failure probability of the wind turbine is determined from the failure probability of the at least one component of the wind turbine. In particular, the failure probability of the wind turbine may be determined based on a multitude of failure probabilities of a multitude of components. An adjustment of the control strategy in accordance with step f may then be based on the failure probability of the wind turbine.

In a respective embodiment, a residual lifetime of the at least one component of the wind turbine and/or of the wind turbine is determined based on the failure probability of the at least one component and/or of the wind turbine. The respective residual lifetime may be the basis for adjusting the control strategy in accordance with step f.

The failure probability of the at least one component of the wind turbine or of the wind turbine may, as mentioned, be the basis for the adjustment of the control strategy. According to an embodiment, the failure probability of the at least one component or of the wind turbine may be compared to a target nominal failure probability, wherein the control strategy is adjusted if the failure probability differs from the target nominal failure probability. The adjustment may be done in particular only then if the failure probability differs from the target nominal failure probability by a predefined amount, for example, by at least 10%. For example, should the determined failure probability be smaller than or equal to the target nominal failure probability, no adaptation of a future turbine operation is necessary and therefore the control strategy need not be adjusted. Should, on the other hand, the determined failure probability be larger than the target nominal failure probability, the wind turbine or the at least one component may fail too soon. In this case, adaptation of the future turbine operation by adjusting the control strategy is done. Also, the residual life time may be determined based on the comparison of failure probability with the target nominal failure probability.

According to an embodiment, at least one safety factor is adjusted based on an adaptation model having as input the statistical load aggregate and a partial safety factor; the (partial) safety factor pertaining to the fatigue load of the at least one component of the wind turbine. Safety factors in general pertain to the fatigue load of a component as is known to the skilled person. These safety factors are used to calculate a fatigue load of the component by generally known methods. The partial safety factor may be based on the uncertainty of the load aggregate. The adjustment of the control strategy in accordance with step f may be done based on the adjusted safety factor. In particular, in this case, the adjustment may be based on at least two statistical load aggregates. Thus, the adaptation model may have as inputs two statistical load aggregates which may be, as explained above, a first statistical load aggregate pertaining to a past wind turbine operation and a second statistical load aggregate pertaining to a future wind turbine operation.

According to a further embodiment, at least one fatigue load may be determined based on the at least one adjusted safety factor and the statistical load aggregate. In this embodiment, the at least one fatigue load may be the basis for adjusting the control strategy in accordance with step f. In particular, according to an embodiment, the at least one fatigue load may be compared to a design load, wherein the control strategy is adjusted if the at least one determined fatigue load differs from the design load. An adjustment may in particular be done only if the fatigue load differs from the design load by a specific amount, for example, by at least 10%. Should the determined fatigue load, for example, be larger than the design load, the future turbine operation may be adapted by adjusting the control strategy. This way, the fatigue load may be reduced down to the design load so that the wind turbine may be operated for the predetermined period. Should the fatigue load, on the other hand, be smaller than the design load, the control strategy may be adjusted such that more energy is taken from the wind via the wind turbine at the cost of a rising fatigue load.

According to a respective embodiment, a residual lifetime of the at least one component of the wind turbine and/or of the wind turbine is determined based on the at least one adjusted safety factor. The control strategy may be adjusted according to step f based on the residual lifetime. The residual lifetime may in particular be calculated based on the determined fatigue load.

BRIEF DESCRIPTION OF THE DRAWINGS

The invention will now be described with reference to the drawings wherein.

DESCRIPTION OF THE PREFERRED EMBODIMENTS

In the following, identical reference numbers indicate identical elements.

Figure 1:
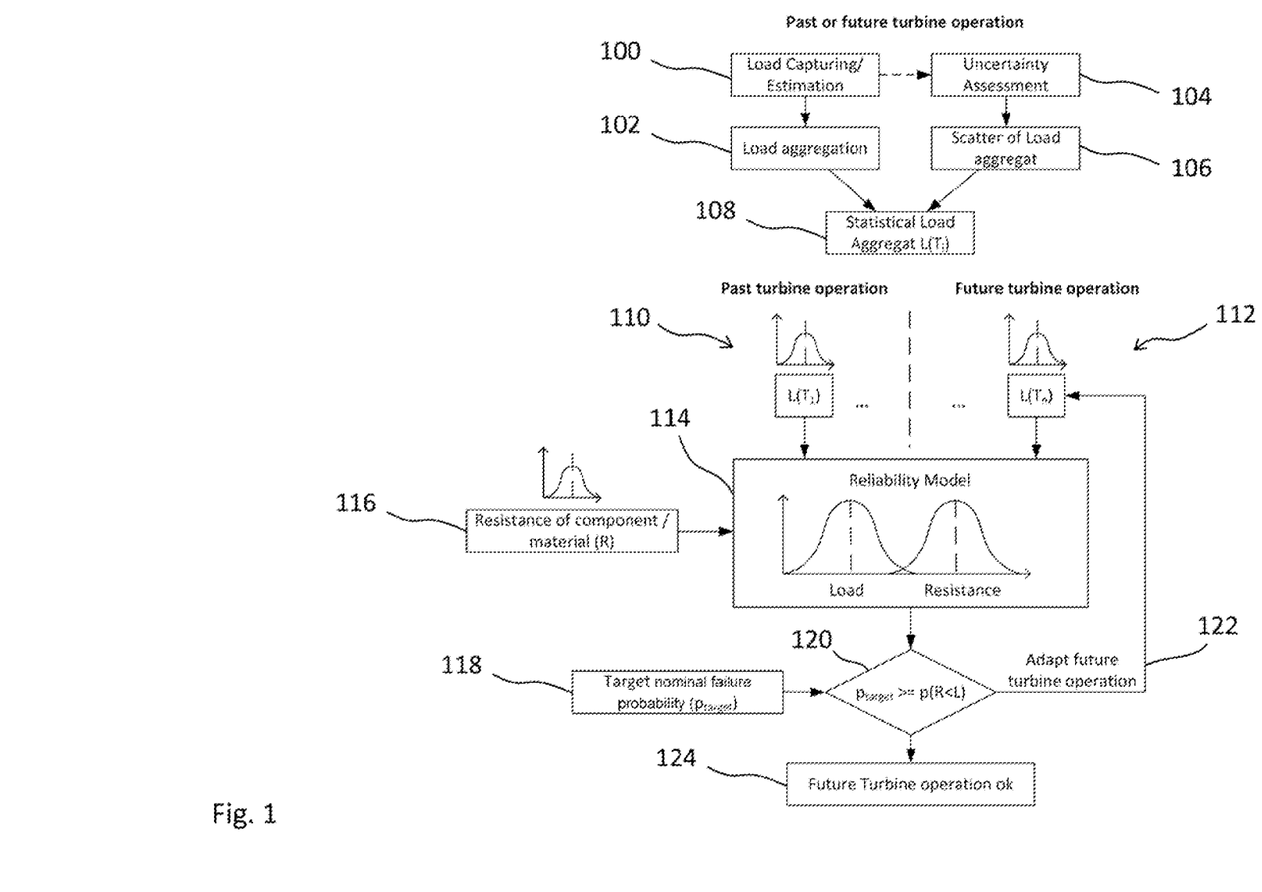
FIG. 1 shows a flow chart of a first embodiment including a reliability model.

In FIG. 1, a flow chart of a method of operating a wind turbine according to a first embodiment is shown. In step 100, loads acting on a component of the wind turbine are captured or estimated so that measured values or estimated values for the load are provided. These measured or captured values are aggregated as input values in step 102 to an aggregated load value. The aggregated load value represents an aggregated load acting on the component of the wind turbine over an aggregation period, for example, over three years. At the same time or successively, uncertainties of the input values, that is, of the captured or estimated loads, are provided in step 104. Based on the uncertainties of the input values, an uncertainty of the aggregated load value is determined in step 106. The uncertainty of the aggregated load value is also denoted as a scatter of the load aggregate. From the aggregated load value determined in step 102 and the uncertainty of the aggregated load value determined in step 106, a so-called statistical load aggregate is determined in step 108. The statistical load aggregate can be understood as the aggregated load value along with its uncertainty or scatter.

Measured loads for step 100 may be provided by capturing via sensors loads acting on the respective component of the wind turbine. Such load measurement may take place continuously during turbine operation. The load aggregation according to step 102 may be based, for example, on an aggregation period over three years, which means the captured load values are aggregated over three years. The aggregation may include summing up the measured loads over the aggregation period. According to the disclosure, the uncertainties of the measured values are considered as well, wherein, in case of measuring the loads via a sensor, the uncertainties may depend on the accuracy of the sensor measurement. From the uncertainties of these measured loads, the uncertainty of the aggregated load value is derived, for example, via means of error propagation. The statistical load aggregate including the aggregated load value and its uncertainty is therefore based on measured load data of the past, in particular of the last three years. Based on this data, that is, based on the statistical load aggregate, the control strategy according to which the wind turbine is operated may be adjusted. For example, depending on what amount of load the respective component has already received during the aggregation period of, for example, three years, the load the respective component will receive in the future may be adjusted by adjusting the control strategy. If the component has already experienced a higher load than predicted when siting the wind farm and configuring the wind turbine, the future turbine operation may be adjusted so that a maximum aggregated load the component may endure is not exceeded during the predicted lifetime of, for example, 20 years. The control strategy may, for example, be adjusted in that the wind turbine is operated at a lower power output. Such a statistical load aggregate is therefore based on past turbine operation.

It is also possible to determine a statistical load aggregate from estimated loads. In this case, for example in step 100, loads may be estimated and used as input values for the load aggregation of step 102. The loads may be estimated on the basis of estimation data input into an estimation model. The estimation data may be operational data of the wind turbine over a specific period or operational data of another wind turbine, for example, a prototype wind turbine or a wind turbine for testing. The uncertainties of the estimated loads therefore include the uncertainties of the estimation input data as well as an uncertainty of the estimation model used to derive the estimated loads from the estimation input data. The uncertainty or scatter of the aggregated load value in step 106 is based on the uncertainties of the estimated loads and may be derived, for example, via means of error propagation. The resulting statistical load aggregate is thus based on estimated loads as well as their respective uncertainties or scatter. A control strategy for operating the wind turbine may be adjusted based on such a statistical load aggregate.

Also, in a further alternative, the input values may be simulated loads; the statistical load aggregate then being based on the simulated loads and their respective uncertainties. Simulated loads can be derived from simulation input data and a simulation model, for example, via aeroelastic multibody simulations, simplified analytic simulations or meta models. The uncertainty or scatter of load aggregates based on simulated loads may be derived via probabilistic methods. Based on simulated loads, a statistical load aggregate expected for the future may be determined.

The statistical load aggregates may be understood, for example, as damage equivalent loads to a specific Wohler or S/N curve gradient.

Thus, via a method of the disclosure, statistical load aggregates pertaining to a turbine operation over an aggregation period $T_i$, for past turbine operation as well as for future turbine operation, may be determined (see reference signs 110 and 112). The statistical load aggregate 110, pertaining to the past turbine operation, is based on an aggregation period $T_1$ in the past, wherein the statistical load aggregate 112 for the future turbine operation is based on an aggregation period $T_n$ in the future.

In the embodiment shown in FIG. 1, both the statistical load aggregates 110, 112 are input into a reliability model 114, which receives a resistance of the respective component or material as further input 116. The resistance of the component means a resistance against loads acting on this component. The resistance may, in particular, include a resistance value and an uncertainty of the resistance value. Via the reliability model, a failure probability of the respective component failing is determined. Based on this failure probability of the component, a failure probability of the wind turbine may be derived. This failure probability p is compared in step 120 to a target nominal failure probability $p_{target}$ input at reference sign 118, wherein the control strategy is adjusted if the failure probability p differs from the target nominal failure probability $p_{target}$ by a predefined amount. If the determined failure probability of the component or turbine is larger than the target nominal failure probability, $p > p_{target}$, the future turbine operation is adapted as is indicated at reference sign 122, meaning that the control strategy according to which the wind turbine is operated is adjusted. Such an adjustment may lead to an adapted statistical load aggregate for the future. If the determined failure probability p is smaller or equal to the target nominal failure probability $p_{target}$, the future turbine operation is considered to be okay (step 124), so that no adjustment of the control strategy is necessary.

Figure 2:
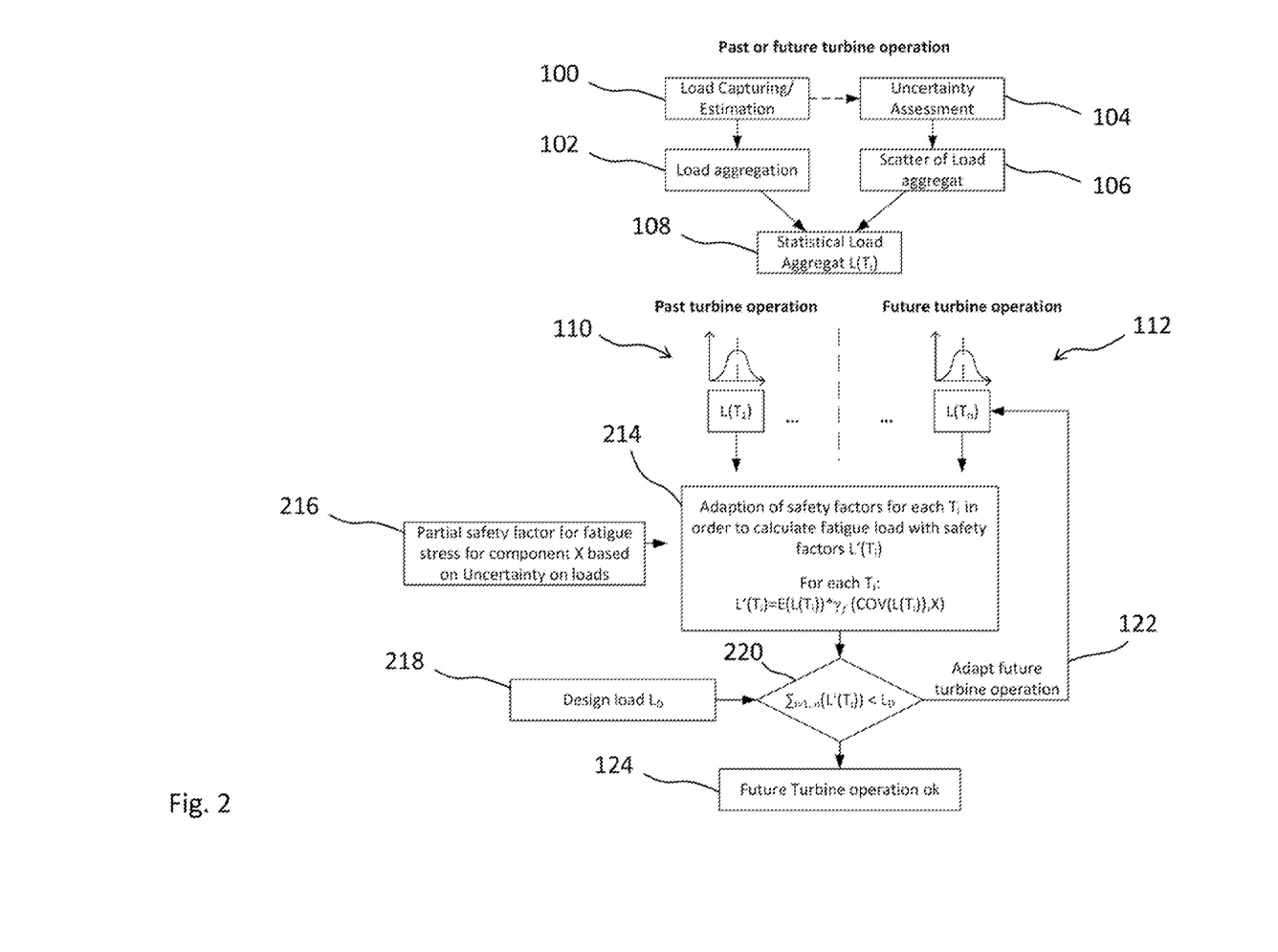
FIG. 2 shows a flow chart of a second embodiment including an adjustment of safety factors; and, FIG. 3 is a schematic showing a wind turbine assembly on which the methods shown in FIGS. 1 and 2 can be carried out.

In the embodiment of FIG. 2, the statistical load aggregates are determined in the same manner as in the first embodiment shown in FIG. 1. The statistical load aggregates 110, 112 are, in contrast to the first embodiment, however, not used as an input for a reliability model but as an input for an adaptation of safety factors (step 214). As a further input, the adaptation model at 214 receives a partial safety factor which is based on the uncertainty of the loads (see reference sign 216). Based on the statistical load aggregates and the partial safety factor, the safety factor is adjusted and a fatigue load is calculated based on the adjusted safety factor. This is done for each of the statistical load aggregates resulting in multiple adjusted safety factors. For each $T_i$, an adjusted safety factor $L'(T_i)$ may be derived via the following equation:

$$L'(T_i) = E(L(T_i)) * \gamma_f COV(L(T_i)), X)$$

wherein $E(L(T_i))$ is an expected value of the statistical load aggregate $L(T_i)$, $COV(L(T_i))$, X) is the coefficient of variation of the statistical load aggregate $L(T_i)$ for component X and $\gamma_f$ is a weighting factor.

In step 220, a sum of these determined fatigue loads is compared to a design load $L_D$ input at reference sign 218. If the sum of the fatigue loads is smaller than the design load $L_D$, an adaptation of the future turbine operation, that is an adjustment of the control strategy, is not necessary (step 124). If the sum of the fatigue loads is larger than the design load $L_D$, future turbine operation should be adapted, that is, the control strategy adjusted, as can be seen at reference sign 122.

Figure 3:
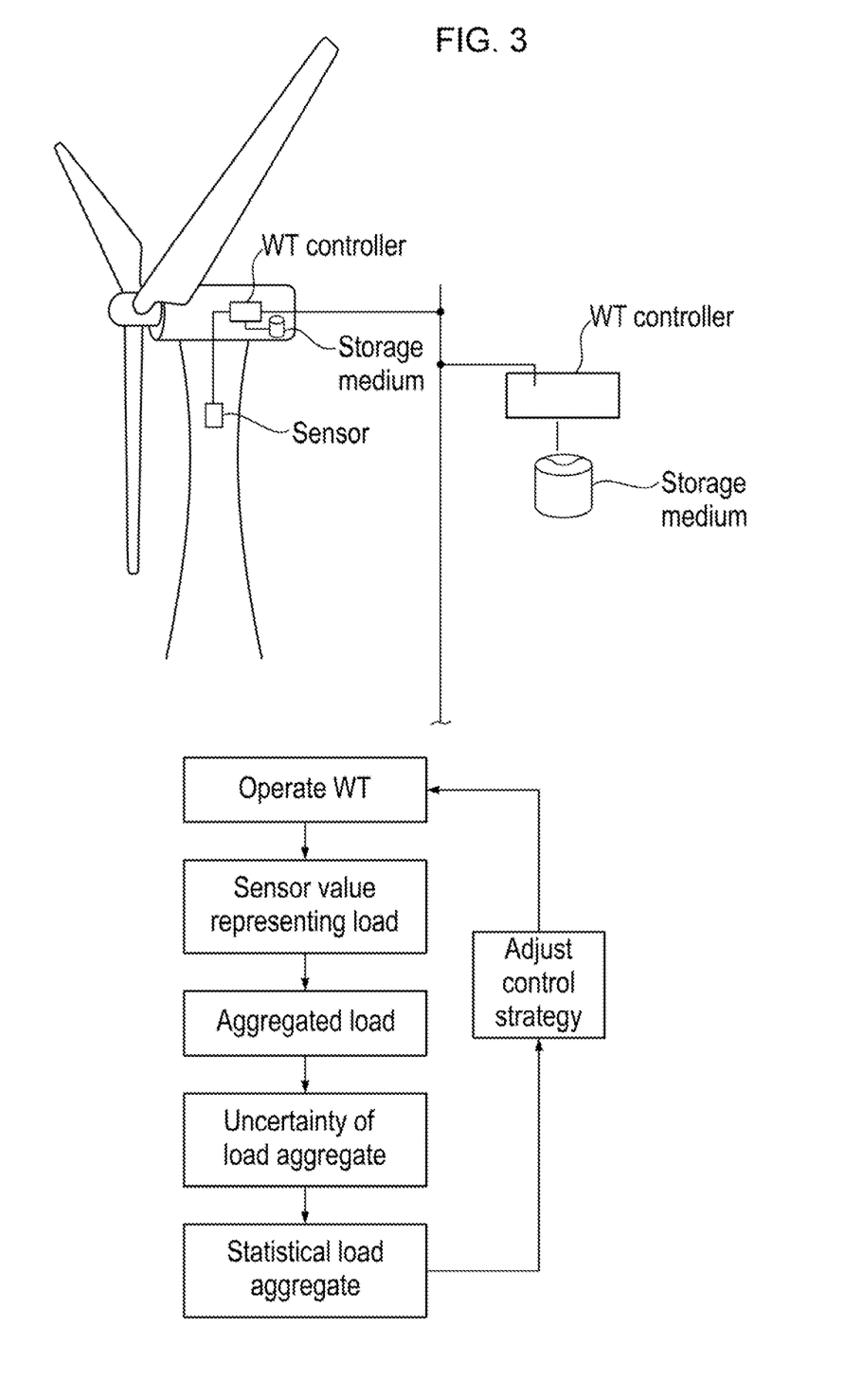

FIG. 3 shows an embodiment of a wind turbine assembly on which the methods shown in FIGS. 1 and 2 can be carried out. The wind turbine assembly includes a wind turbine having at least one component subject to a load. A wind turbine controller has a processor and is operatively connected to the at least one component. A non-transitory computer readable storage medium has a program code stored thereon, wherein the program code, when executed by the processor of the wind turbine controller, is configured to perform the following method steps:

a. operate the wind turbine over an operating period in accordance with a control strategy;
b. provide one or more input values representing the load acting on the at least one component of the wind turbine and providing uncertainties of the input values;
c. determine, based on the input values, an aggregated load value representing an aggregated load acting on the at least one component of the wind turbine over an aggregation period;
d. determine, based on the uncertainties of the input values, an uncertainty of the aggregated load value;
e. determine a statistical load aggregate from the aggregated load value and the uncertainty of the aggregated load value; and,
f. adjust the control strategy based on the statistical load aggregate.

According to the disclosure, future wind turbine operation is adapted based not only on determined loads, but also on the uncertainty of these loads. As the inventors realized, this may allow for a more precise prediction of the future loads and therefore a more reasonable and precise adjustment of the control strategy for operating the wind turbine. Thus, via an iterative calculation based on a reliability model, an optimized planned operation or a service life adjustment of the wind turbine may be achieved while maximizing the yield and utilizing a maximum target resistance. Also, by iterative comparison of the loads with the design loads, the future wind turbine operation can be optimized, in particular, the yield of the wind turbine may be maximized while utilizing the design loads.

It is understood that the foregoing description is that of the preferred embodiments of the invention and that various changes and modifications may be made thereto without departing from the spirit and scope of the invention as defined in the appended claims.

What is claimed is:

1. A method of operating a wind turbine, comprising:
    a. operating the wind turbine over an operating period in accordance with a control strategy;
    b. providing one or more input values representing a load acting on at least one component of the wind turbine and providing uncertainties of the input values;
    c. determining, based on the input values, an aggregated load value representing an aggregated load acting on the at least one component of the wind turbine over an aggregation period;
    d. determining, based on the uncertainties of the input values, an uncertainty of the aggregated load value;

e. determining a statistical load aggregate from the aggregated load value and the uncertainty of the aggregated load value; and, f. adjusting the control strategy based on the statistical load aggregate.

2. The method of claim 1, wherein, in step b, measured loads are provided as input values and, in step b, uncertainties of the measured loads are provided.

3. The method of claim 1, wherein, in step b, estimated loads derived from an estimation model are provided as input values; in step b, uncertainties of the estimated loads are provided comprising uncertainties of estimation input data and an uncertainty of the estimation model; in step c, the aggregated load value is determined based on the estimated loads; and in step d, the uncertainty of the aggregated load value is determined based on the uncertainties of the estimated loads.

4. The method of claim 1, wherein, in step b, simulated loads are derived from a simulation model and provided as input values; in step b, uncertainties of the simulated loads are provided comprising uncertainties of simulation input data and an uncertainty of the simulation model; in step c, the aggregated load value is determined based on the simulated loads; and, in step d, the uncertainty of the aggregated load value is determined based on the uncertainties of the simulated loads.

5. The method of claim 1, wherein the control strategy is adjusted and comprises one or more of: adjusting a planned operation period of the at least one component of the wind turbine, adjusting a planned operation period of the wind turbine, and adjusting one or more operation parameters of the wind turbine.

6. The method of claim 1, wherein at least two statistical load aggregates are determined in accordance with steps b to e; and, a first statistical load aggregate of the at least one component of the wind turbine is determined for a past aggregation period and a second statistical load aggregate of the at least one component of the wind turbine is determined for a future aggregation period.

7. The method of claim 1, wherein a failure probability of the at least one component of the wind turbine is determined based on a reliability model for the at least one component of the wind turbine having as input the determined statistical load aggregate of the at least one component of the wind turbine and a resistance of the at least one component of the wind turbine.

8. The method of claim 7, wherein a failure probability of the wind turbine is determined based on the determined failure probability of one or more of the at least one component of the wind turbine.

9. The method of claim 7, comprising the further step of determining a residual lifetime of the at least one component of the wind turbine based on the determined failure probability of the at least one component of the wind turbine and/or based on the determined failure probability of the wind turbine.

10. The method of claim 7, comprising the further step of comparing the failure probability to a target nominal failure probability, wherein the control strategy is adjusted if the failure probability differs from the target nominal failure probability.

11. The method of claim 1, further comprising adjusting at least one safety factor based on an adaptation model having as input the statistical load aggregate and a partial safety factor, the at least one safety factor pertaining to a fatigue load of the at least one component of the wind turbine.

12. The method of claim 11, further comprising determining a residual lifetime of the at least one component of the wind turbine and/or of the wind turbine based on the at least one adjusted safety factor.

13. The method of claim 11, further comprising determining at least one fatigue load based on the at least one adjusted safety factor and the statistical load aggregate.

14. The method of claim 13, further comprising determining a residual lifetime of the at least one component of the wind turbine and/or of the wind turbine based on the at least one adjusted safety factor.

15. The method of claim 14, further comprising comparing the at least one fatigue load to a design load, wherein the control strategy is adjusted if the at least one fatigue load differs from the design load.

16. A wind turbine assembly comprising:
a wind turbine having at least one component subject to a load;
a wind turbine controller having a processor and being operatively connected to said at least one component;
a non-transitory computer readable storage medium having program code stored thereon, wherein said program code, when executed by said processor of said wind turbine controller, is configured to:
a. operate the wind turbine over an operating period in accordance with a control strategy;
b. provide one or more input values representing the load acting on the at least one component of the wind turbine and providing uncertainties of the input values;
c. determine, based on the input values, an aggregated load value representing an aggregated load acting on the at least one component of the wind turbine over an aggregation period;
d. determine, based on the uncertainties of the input values, an uncertainty of the aggregated load value;
e. determine a statistical load aggregate from the aggregated load value and the uncertainty of the aggregated load value; and,
f. adjust the control strategy based on the statistical load aggregate.

17. A wind farm comprising:
at least one wind turbine having at least one component subject to a load;
a wind farm controller having a processor and being operatively connected to said at least one component; and,
a non-transitory computer readable storage medium having program code stored thereon, wherein said program code, when executed by said processor of said wind farm controller, is configured to:
a. operate the at least one wind turbine over an operating period in accordance with a control strategy;
b. provide at least one input value representing the load acting on the at least one component of the at least one wind turbine and providing uncertainties of the at least one input value;
c. determine, based on the input values, an aggregated load value representing an aggregated load acting on the at least one component of the at least one wind turbine over an aggregation period;
d. determine, based on the uncertainties of the at least one input value, an uncertainty of the aggregated load value;
e. determine a statistical load aggregate from the aggregated load value and the uncertainty of the aggregated load value; and, f. adjust the control strategy based on the statistical load aggregate.

* * * * *